United States Patent
DePaulis et al.

(10) Patent No.: US 6,971,716 B2
(45) Date of Patent: Dec. 6, 2005

(54) SYSTEM FOR TRANSPORTING VEHICLE SEATS AND FLOOR MATS

(75) Inventors: Todd M. DePaulis, Dearborn, MI (US); Martin Brzozowski, Belleville, MI (US); Steve Clark, Canton, MI (US); Ryan Saling, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/337,797

(22) Filed: Jan. 7, 2003

(65) Prior Publication Data

US 2003/0155796 A1    Aug. 21, 2003

Related U.S. Application Data

(60) Provisional application No. 60/358,172, filed on Feb. 20, 2002.

(51) Int. Cl.[7] .............................. A47C 7/62; A47C 31/10
(52) U.S. Cl. .............. 297/229; 297/228.1; 297/228.11; 297/228.12; 297/228.13; 297/219.1; 297/188.01; 297/188.04; 297/188.06; 297/188.07; 297/188.2
(58) Field of Search ...................... 297/188.01, 188.04, 297/188.06, 188.07, 188.12, 188.13, 188.2, 297/228.1, 228.11, 228.12, 228.13, 229, 219.1

(56) References Cited

U.S. PATENT DOCUMENTS

| | | | | |
|---|---|---|---|---|
| 2,223,532 | A | * | 12/1940 | Sallop .................... 297/188.06 |
| 2,270,598 | A | * | 1/1942 | Morgan ................... 297/188.06 |
| 2,822,968 | A | * | 2/1958 | Jackson .................. 297/188.06 |
| 3,014,759 | A | * | 12/1961 | Bing ....................... 297/188.06 |
| 3,333,890 | A |   | 8/1967 | Whitwam ............... 297/188.04 |
| 3,479,085 | A | * | 11/1969 | Weistein ................ 297/188.06 |
| 3,695,692 | A |   | 10/1972 | Williams ..................... 297/229 |
| 4,655,347 | A |   | 4/1987 | Horn |
| 4,676,376 | A |   | 6/1987 | Keiswetter ............... 297/228.1 |
| 4,840,497 | A |   | 6/1989 | Harber et al. |
| 4,856,654 | A |   | 8/1989 | Reuben |
| 4,879,442 | A |   | 11/1989 | Giovine |
| 4,884,839 | A |   | 12/1989 | Keiswetter .................. 297/219 |
| 5,004,295 | A |   | 4/1991 | Inoue .................... 297/188.07 |
| D345,908 | S |   | 4/1994 | Wallach |
| 5,308,139 | A |   | 5/1994 | Rieger ........................ 297/229 |
| 5,354,119 | A | * | 10/1994 | Nicholas ................ 297/188.07 |
| 5,622,281 | A |   | 4/1997 | Annand |
| 5,639,145 | A | * | 6/1997 | Alderman .......... 297/188.04 X |
| 5,709,431 | A |   | 1/1998 | Horn .......................... 297/228 |

(Continued)

FOREIGN PATENT DOCUMENTS

DE           80 23 722        12/1980

(Continued)

Primary Examiner—Rodney B. White
(74) Attorney, Agent, or Firm—MacMillan, Sobanski & Todd, LLC

(57) ABSTRACT

A cover for temporarily protecting a vehicle seat that has a seat back and a seat bottom. The cover includes a pouch portion adapted to be disposed over a portion of the seat back, and a pocket adapted to receive a floor mat. Alternatively, the cover can include an extension portion adapted to be disposed over a portion of the seat bottom with a pocket adapted to receive a floor mat. A method of transporting a vehicle seat and floor mat to a vehicle assembly plant is also disclosed. The method includes the steps of providing a vehicle seat, providing a floor mat, packaging the vehicle seat and floor mat as a single unit defining a seat assembly, and transporting the seat assembly to a vehicle assembly plant.

20 Claims, 4 Drawing Sheets

U.S. PATENT DOCUMENTS

| | | | | |
|---|---|---|---|---|
| 5,713,627 A | * | 2/1998 | De Filippo | 297/188.04 |
| D396,984 S | | 8/1998 | Harvey et al. | |
| 5,867,387 A | | 2/1999 | Kavana | |
| 5,878,672 A | * | 3/1999 | Ostermann et al. | 297/188.06 X |
| 5,911,476 A | | 6/1999 | Horn | 297/228.1 X |
| 5,957,528 A | * | 9/1999 | Campbell | 297/228.1 X |
| 6,006,462 A | * | 12/1999 | Lackomar | 297/188.06 X |
| 6,030,034 A | * | 2/2000 | Plohetski | 297/188.06 |
| 6,048,026 A | | 4/2000 | Barnett et al. | 297/229 |
| 6,050,639 A | | 4/2000 | Horn | 297/228.1 X |
| 6,067,777 A | | 5/2000 | Stoll | 297/219.1 |
| D440,107 S | | 4/2001 | Hsu | |
| 6,309,017 B1 | | 10/2001 | Middleton | 297/228.13 |
| 6,345,866 B1 | * | 2/2002 | Jackson et al. | 297/228.12 |
| 6,447,059 B1 | * | 9/2002 | Jackson et al. | 297/188.06 X |
| 6,533,350 B1 | * | 3/2003 | Rotstein | 297/188.04 |

FOREIGN PATENT DOCUMENTS

| | | | | |
|---|---|---|---|---|
| DE | 36 01 390 | | 8/1987 | |
| DE | 3637582 A1 | * | 5/1988 | 297/188.07 |
| DE | 200 22 003 | | 6/2001 | |
| EP | 0 564 872 | | 10/1993 | |
| EP | 260182 A2 | * | 3/1998 | 297/188.07 |

\* cited by examiner

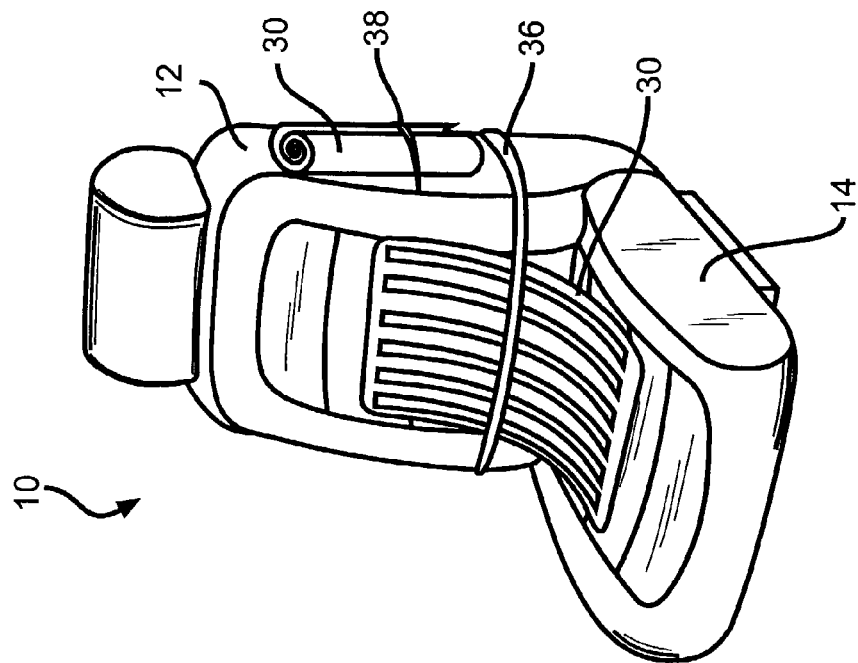
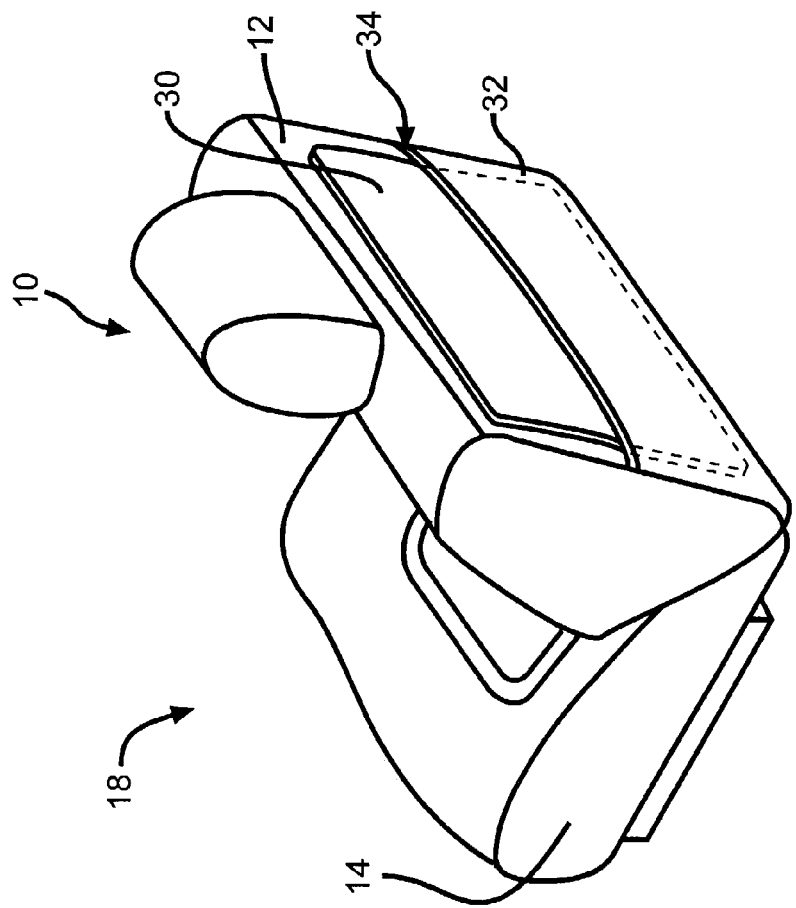

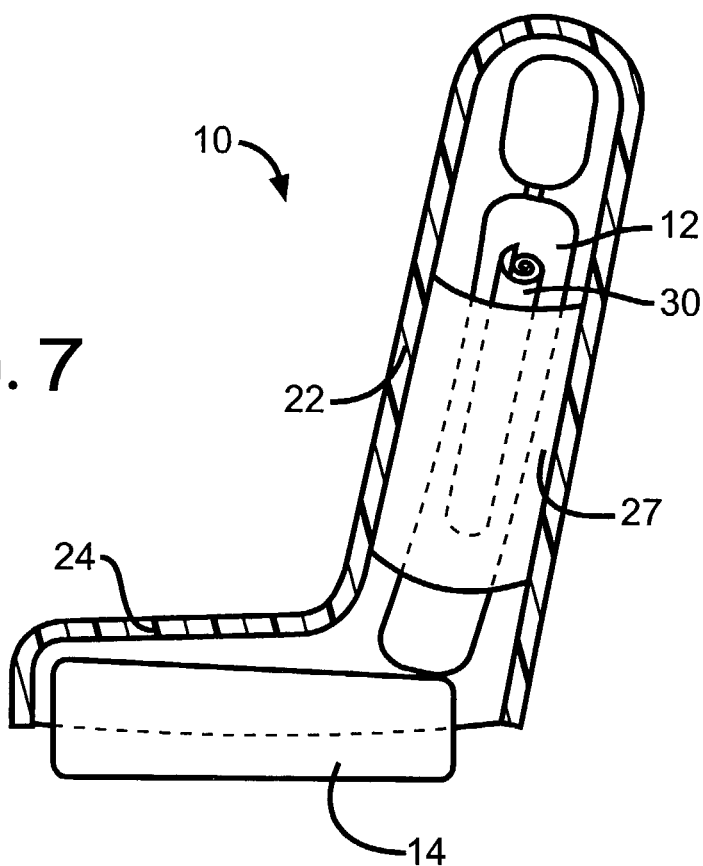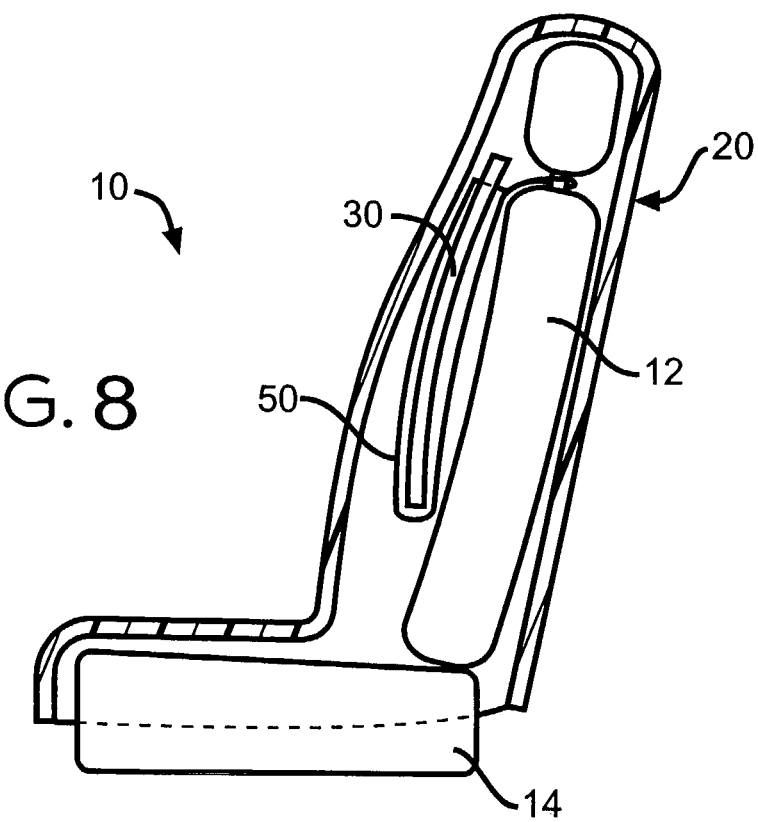

SYSTEM FOR TRANSPORTING VEHICLE SEATS AND FLOOR MATS

This application claims the benefit of Provisional Application No. 60/358,172, filed Feb. 20, 2002.

BACKGROUND OF THE INVENTION

This invention relates in general to the transportation and installation of vehicle seats and floor mats from a manufacturing facility to an assembly facility.

Commonly, vehicle seats are manufactured and assembled in a manufacturing facility. After assembly, the seats are transported to a vehicle assembly facility where the seats are installed into a vehicle. At the vehicle assembly facility, most of the parts of a vehicle are assembled prior to the vehicle being shipped to an automobile dealership. The assembly generally includes the vehicle frame, vehicle body, and vehicle interior components. An assembled vehicle is then transported to a dealership or other point-of-sale location for sale to the public. To protect and cover the seats during transport, and more specifically, protect the seat upholstery, a protective cover can be placed over the seat prior to shipment of the seat to the vehicle assembly facility. All of the vehicle seats may be covered or only the driver seat may be covered. The cover generally covers the exposed areas of the seat. As shown in FIG. 3, a seat 10 generally includes a seat back 12 and a seat cushion or bottom 14. A cover 20 has an upper pouch portion 18 which is placed over the seat back 12, and an extension portion 20 extending from the bottom of the pouch portion covering the seat bottom 14. The cover 20 is shaped to generally conform to the shape of the seat, and in particular the exposed upholstery surfaces. The cover 20 helps prevent the seat upholstery of the seat back 12 and seat bottom 14 from being soiled during transport and from the environment at the assembly facility. The cover also helps protect the seat from abrasions or tearing that can occur during shipment, installation of the seat, or installation of other components of the vehicle after the seat has been installed.

The cover 20 is also typically left on the seat during shipment of the vehicle to a dealer lot where the vehicle is then sold to an end user. This helps prevent a driver of the vehicle other than the end user from damaging or contaminating the seat prior to the purchase of the vehicle to the end user.

Most vehicles are also equipped with separate floor mats that cover the carpet and/or floor of the vehicle generally in the vicinity where the occupants' feet are located. The mats help to protect the carpet from excessive wear and contaminates. Additionally, the floor mats are usually positioned for the occupants of the driver and front passenger seat, and occupants in the seats behind the driver and front passenger. However, if a vehicle has a seating position for an occupant between the front or rear seat occupants, there generally is not a separate floor mat therefore, although such a floor mat could be supplied. Additionally, for vehicles having a third row seat, the vehicle could optionally be equipped with floor mats for such seating positions. Generally, floor mats are shaped to fit within the area in which they are to be positioned. For example, for a driver's seat, the floor mat can be shaped such that the portion of the floor mat extends to cover the flooring below the pedals. Similarly, as there is usually more leg room for a front seat passenger, the floor mat for such a seat could also extend to generally cover the carpeted area in the footwell area of the front passenger seat. For rear seats, where there is generally less leg room, the floor mats for those seats are smaller.

The mats are typically manufactured in a manufacturing facility and transported in bulk to the vehicle assembly facility. The mats are typically placed in a large container placed along the assembly line. Since most models of vehicles commonly will be equipped with one of a variety of different mats, multiple containers housing the different styles of mats are located in the assembly facility. The style and placement area of the mats may correspond to the style of the seat which is installed into the vehicle. For example, standard seats to be installed in a vehicle may come with one style of floor mats. Leather seats or another premium seat option for the same vehicle may include premium floor mats. A worker of the assembly facility would select the appropriate mats from the appropriate container and place the mats in the vehicle. While such a process has been acceptable, it would be advantageous to eliminate the potential for human error wherein floor mats for a vehicle with premium seats, for example, could be mismatched with a vehicle having standard seats. Additionally, at a vehicle assembly facility, there could potentially be limited floor space. Therefore eliminating the requirements for a separate storage of floor mats would save this floor space in the facility. Also, during the vehicle assembly process, the floor mats are often placed in areas other than their final placement, such as in a trunk or cargo area. Once at the dealer lot, a worker would separate the mats and install them into the vehicle. The dealer usually charges for this installation service under a "dealer prep" charge. Alternatively, the end user can position the floor mats as desired.

BRIEF DESCRIPTION OF THE DRAWINGS

FIG. 1 is a rear perspective view of a vehicle seat, in accordance with the present invention, which allows for the retention of a floor mat behind the seat.

FIG. 2 is a front perspective view of a vehicle seat, in accordance with the present invention, which allows for the retention of a floor mat with the seat.

FIG. 7 is a side elevational view of a vehicle seat having a protective cover disposed thereon, which allows for the retention of a floor mat in a pocket on the side of the cover.

FIG. 8 is a side elevational view of a vehicle seat having a protective cover disposed thereon, and having a separate receptacle carried with the vehicle seat which allows for the retention of a floor mat therein.

DETAILED DESCRIPTION OF THE INVENTION

Figure 3:
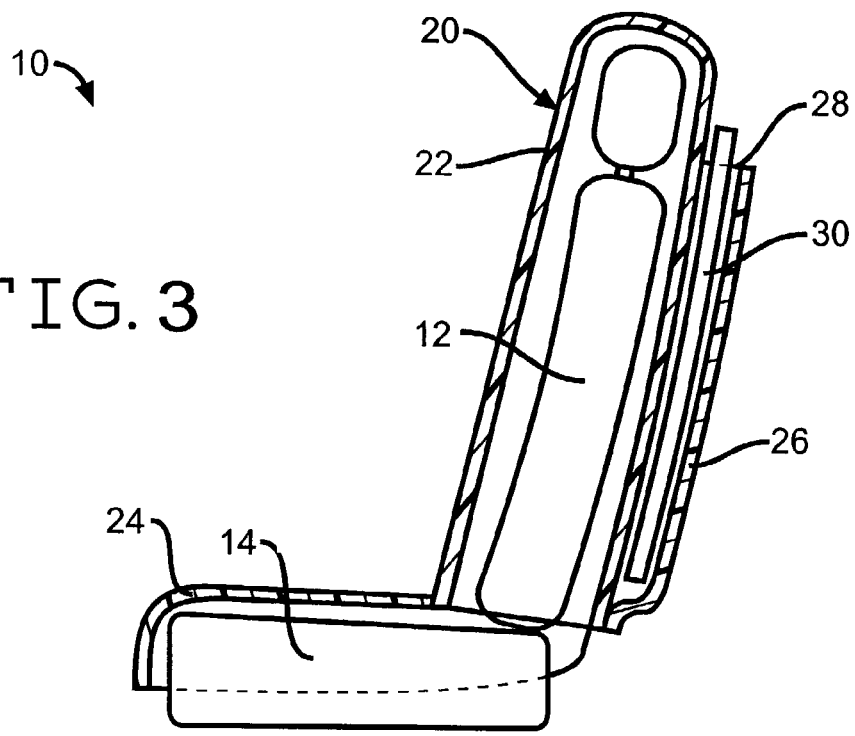
FIG. 3 is a side elevational view of a vehicle seat having a protective cover disposed thereon, in accordance with the present invention, which allows for the retention of a floor mat behind the seat, with the cover shown in cross-section.

Referring now to the drawings, there is illustrated in FIG. 1, is a vehicle seat 10 including the seat back 12 and the seat bottom 14. The seat back 12 also includes an open top pocket 32 defining an opening 34. The seat back pocket 32 is typically used by the occupant of a seat positioned behind the seat 10 having the pocket 32 for placing articles therein. The pocket 32 can be located anywhere on the seat back 12. For example, the pocket 32 is preferably located adjacent the back of the seat back 12 as shown in FIG. 1. However, the pocket 32 can be located elsewhere on the seat 10 such as on either side of the seat back 12, or on either side of the seat bottom 14, or any other suitable location. The pocket 32 can be formed by attaching or seaming sides and the bottom of a relatively flat sheet of material onto the side and/or back portion of the seat back 12. It is preferred that the material corresponds to the color and texture of the vehicle seat 10. However, for example, a leather fabric pocket can be used on a cloth seat or vice versa. The open top pocket 32 is adapted to receive one or more floor mats 30. The pocket 32 could also open from either the left or right side or both and be sealed at the top. The floor mats 30 could then be moved laterally into the opening 34 of the pocket 32 for retention therewith. In either a top or side opening configuration, the pocket 32 could also include a closure mechanism, such as a zipper, buttons, static seal, Velcro, zip-seal strip or any other suitable closure mechanism. If the pocket 32 is on the side of the seat back 12 or the side of the seat bottom 14, the floor mats 30 could be rolled before being placed within the pocket so as to fit into the smaller pocket area.

One or more floor mats 30 which correspond to the style of floor mat which is to be installed with the particular style seat 10 is placed in the pocket 32. Thus, the seat 10 and the floor mats 30 are a matched set which would be installed into the same vehicle configuration. The seat 10 packaged with the floor mats 30 defines a seat assembly 18 which is transported to the vehicle assembly facility. The seat assembly 18 is installed into the vehicle such as by fastening the seat bottom 14 to the floor of the vehicle. Installation of the seat assembly 18 in the vehicle automatically places the appropriately matched floor mats 30 in the vehicle. The term "packaged" as used with the seat 10 and floor mats 30 generally means that the seat 10 and floor mats 30 are shipped from one location to another as a single unit. Examples of a seat being "packaged" include merely placing the floor mats 30 on a seat or seats 10, tying or otherwise binding the floor mats 30 to a seat 10. Additionally, after floor mats 30 are placed with a seat 10, additional packaging can include wrapping the seat assembly 18 with plastic, paper, shrink-wrap, bubble-wrap, or other shipping material, or placing the seat assembly 18 in a box.

In an alternate embodiment, each seat 10 in the vehicle can include a pocket 32 that is similar to the one described above. Each seat pocket 32 can receive one or more floor mats 30. In this embodiment, it is preferred that each pocket 32 contain the floor mat 30 corresponding to that seat 10. This will allow the dealer or the end user to properly place the correct floor mat 30 with the designated seat 10. Alternatively, a single seat 10 on each of the left and right side of the vehicle, such as the driver and front passenger seat, can have a pocket 32. Each of such pockets 32 would contain the floor mats 30 that correspond to each of the left and right seats, including the respective rear seats. In yet another embodiment, either of the front seats and either of the rear seats could include pockets 32. The front seat with the pocket 32 would contain the floor mats 30 for each of the front seats. Similarly, the rear seat with the pocket 32 would contain the floor mats 30 for each of the rear seats.

Illustrated in FIG. 2 is the same general vehicle seat 10 as shown in FIG. 1. However, in this embodiment, regardless of whether the seat 10 has a pocket 32 formed thereon, the floor mats 30 can be packaged with the seat 10 by placing the floor mats 30 on the seat bottom 14 such that a portion of the floor mats 30 are also partially supported on the seat back 12. The floor mats 30 can be secured with the seat 10 by any suitable means. However, it is preferred that the floor mats 30 are secured to the seat 10 by a strap 36 that either partially or completely encircles the seat back 12. Alternatively, the strap 36 can hold the floor mats 30 in place about the seat bottom 14, or both the seat bottom 14 and seat back 12. The strap 36 can be an elastic band, a plastic binding, rope, a rubber band, or any other suitable retaining mechanism. It is preferred that the strap 36 does not cause any damage to the seat 10 when placed thereabout. In a further alternate embodiment, a strap 38 can extend from the side of the seat 10 such that the floor mats 30 can be placed within the loop formed by the strap 38. Further, such a strap 38 that is connected to the seat 10 is preferably removable by the end user or some intermediate party.

Illustrated in FIG. 3 is the vehicle seat 10 including the seat back 12 and the seat bottom 14. A flexible protective cover 20 is disposed over portions of the seat 10. The cover 20 includes an open bottom upper pouch 22 which preferably generally conforms to and covers the seat back 12 such that the top, front, back, and sides of the seat back 12 are covered. The cover 20 also includes an extension portion 24 which extends outwardly from a bottom portion of the upper pouch 22 and generally conforms to the seat bottom 14 such that the top, front, and sides are covered. The extension portion 24 can simply be a flexible flat sheet which is draped over the seat bottom 14, or the extension portion 24 can be contoured similarly to the seat bottom 14. Additionally, the lower portions of the extension portion 24 and the upper pouch 22 can include an elastic band such that the extension portion 24 gathers around the seat bottom 14.

Figure 4:
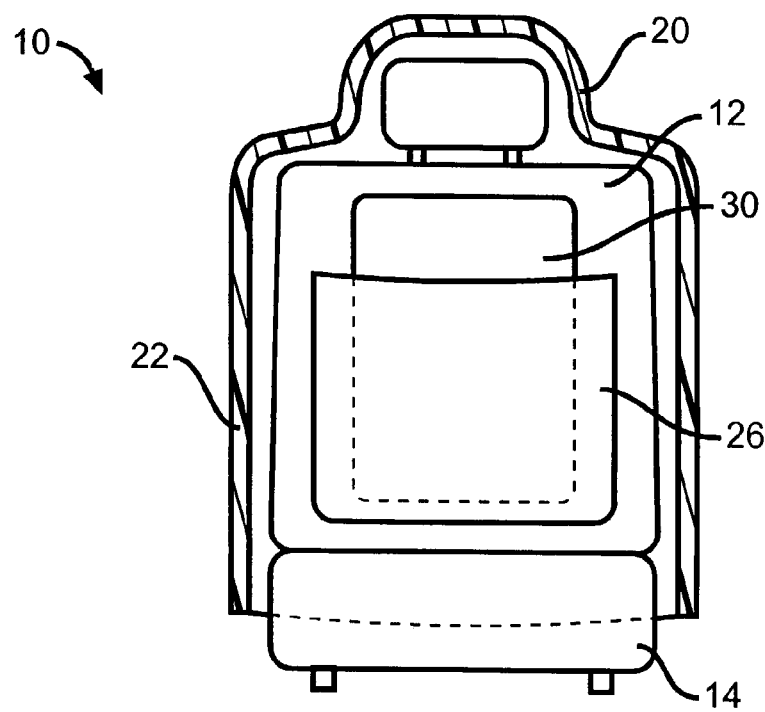
FIG. 4 is a rear elevational view of the vehicle seat of FIG. 1 with the cover shown in cross-section.
Figure 5:
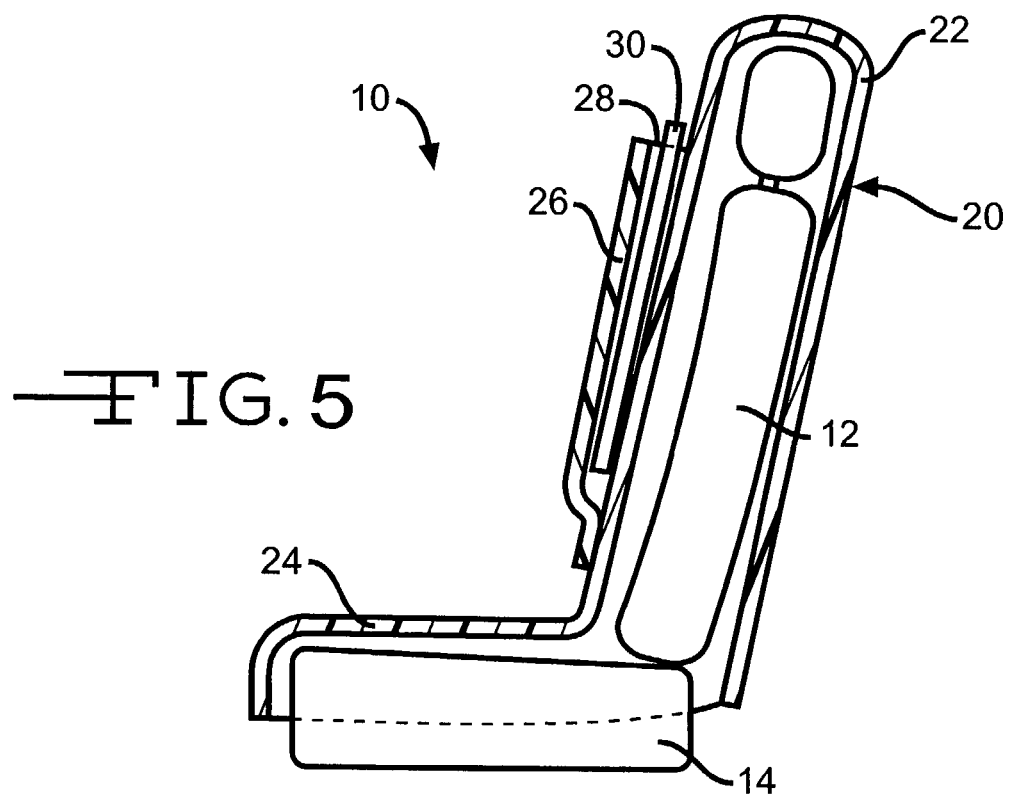
FIG. 5 is a side elevational view of a vehicle seat having a protective cover disposed thereon, in accordance with the present invention, which allows for the retention of a floor mat in front of the seat, with the cover shown in cross-section.
Figure 6:
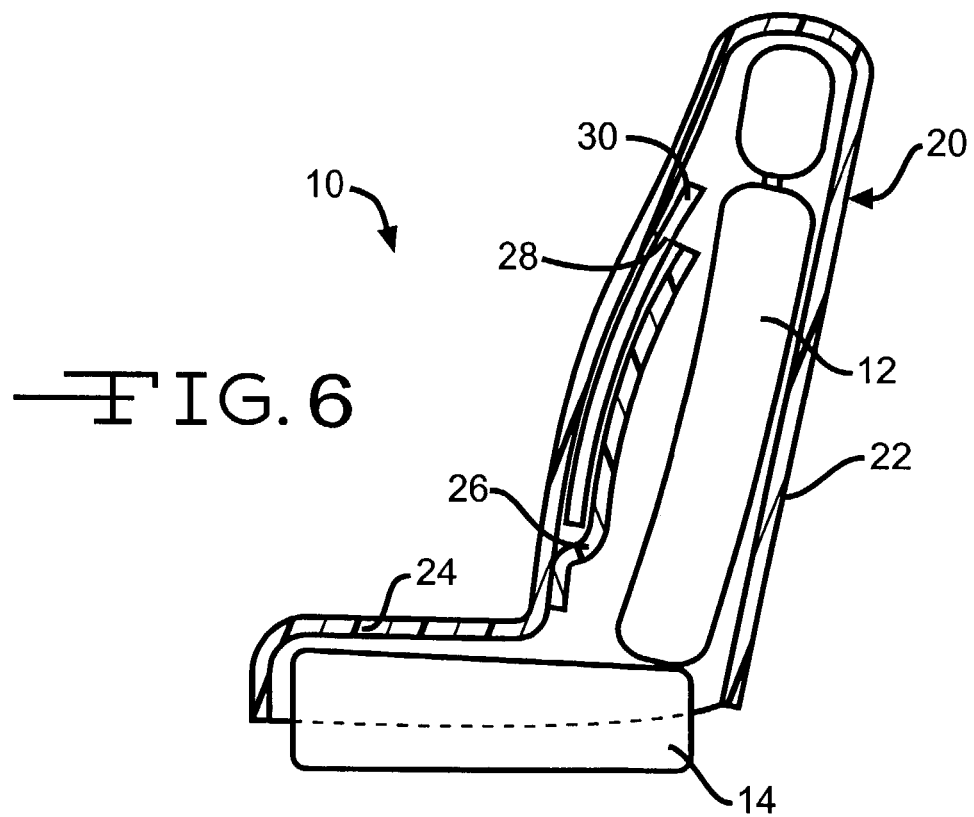
FIG. 6 is a side elevational view of a vehicle seat having a protective cover disposed thereon, in accordance with the present invention, which allows for the retention of a floor mat in a pocket inside the cover, with the cover shown in a cross-section.

The cover 20 can also include an open top pocket 26 defining an opening 28. The pocket 26 can be located anywhere on the cover 20. For example, the pocket 26 can be located adjacent the back of the pouch 22, as shown in FIGS. 3 and 4. Alternatively, for example, the cover 20 can be located adjacent the front of the pouch 22, as shown in FIG. 5, or inside the cover 20 as shown in FIG. 6. Also, the pocket 26 can be located elsewhere on the cover 20 such as on the extension portion 24, on either side of the upper pouch 22, on either side of the extension portion 24, on the forward portion of the extension portion, or any other suitable location. If the pocket 27 is on the side of the upper pouch 22 (as illustrated in FIG. 7), the side of the extension portion 24, or on the forward portion of the extension portion the floor mats 30 could be rolled before being placed within the pocket 27. The pockets 26 or 27 can be formed by attaching or seaming sides and the bottom of a relatively flat sheet of material onto the side and/or back portion of the cover 20. The pocket 26 or 27 is adapted to receive one or more floor mats 30. The pocket 26 or 27 could also open from either the left or right side or both and be sealed at the top. The floor mats 30 could then be moved laterally into the opening of the pocket 26 or 27 for retention therewith. In any of the above-described opening configurations, the pocket 26 or 27 could also include a closure mechanism, such as a zipper, buttons, static seal, Velcro, zip-seal strip or any other suitable closure mechanism.

Illustrated in FIG. 8 is an alternate embodiment of the present invention. Either as a part of the cover, or as a distinct pocket that is separate from the outer cover is a pocket for holding the floor mats. It is preferred that the separate pocket have a handle portion that can be placed over the head rest, and is therefore supported with the headrest. The pocket can be positioned in front of or behind the seatback of the seat. Then, the cover can be positioned over the entire seat, also covering the pocket. As indicated above, the pocket can be positioned on any seat in the vehicle, or on multiple seats and contain a floor mat for each respective seat.

The cover 20 can be made of any suitable flexible material. For example, the cover 20 can be made of a plastic material, such as polyethylene or polypropylene. The cover 20 can be formed by any suitable manner, such as by seaming flat sheets and/or tubular-shaped portions together.

The use of the cover 20 will now be explained. After manufacturing of the seat 10 at a manufacturing facility, the cover 20 is preferably installed onto the seat 10 such that the pouch 22 generally covers the seat back 12, and the extension portion 22 generally covers the seat bottom 14. One or more floor mats 30 which correspond to the style of floor mat which is to be installed with the particular style seat 10 is placed in the pocket 26 or 27. Thus, the seat 10 and the floor mats 30 are a matched set which would be installed into the same vehicle configuration. The seat 10, the cover 20 and the floor mats 30 define a seat assembly 18 which is transported to the vehicle assembly facility. The seat assembly is installed into the vehicle such as by fastening the seat bottom 14 to the floor of the vehicle. Installation of the seat assembly in the vehicle automatically places the appropriately matched floor mats 30 in the vehicle.

In an alternate embodiment, each seat in the vehicle can be covered using the cover 20. Each cover, in turn, has a pocket 26 or 27 which can receive one or more floor mats 30. In this embodiment, it is preferred that each pocket 26 or 27 contain the floor mat 30 corresponding to that seat 10. This will allow the dealer or the end user to properly place the correct floor mat 30 with the designated seat 10. Alternatively, a single seat 10 on each of the left and right side of the vehicle, such as the driver and front passenger seat, can have a pocket 26 or 27. Each of such pockets 26 or 27 would contain the floor mats 30 that correspond to each of the left and right seats, including the rear seats. In yet another embodiment, either of the front seats and either of the rear seats could be covered using the cover 20. The front seat with the cover 20 having a pocket would contain the floor mats 30 for each of the front seats. Similarly, the rear seat with the cover 20 having a pocket 26 or 27 would contain the floor mats 30 for each of the rear seats.

An advantage of the present invention over the method discussed in the Background section of this application is that an installer at the assembly facility does not have to separately select the correct floor mats 30 and place them in the vehicle. Also, the containers of the mats 30 are not required, thereby freeing up valuable space in the assembly facility near the assembly line. The present invention also relieves floor mat inventory problems, such as for "just in time" applications where only select amount of seat assemblies are shipped to the assembly facility. The installer may also at this time remove the floor mats 30 from the pocket 26 and properly position them within the interior of the vehicle. Note that the mats 20 may also be covered with a protective layer or film.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of packaging a vehicle seat and floor mat to be transported to a vehicle assembly plant comprising the steps of:
    a. providing a vehicle seat separate from and not yet installed in a vehicle;
    b. providing a complementary floor mat corresponding to the style of the seat;
    c. pairing the vehicle seat and the floor mat as a matched set defining a seat assembly; and
    d. transporting the seat assembly to a vehicle assembly plant, wherein the vehicle seat is transported separately from the vehicle in which it is to be installed.

2. The method of claim 1 further including the steps of: installing the seat assembly into a vehicle; and separating the floor mat from the vehicle seat and placing the floor mat into the vehicle.

3. The method of claim 1 wherein the floor mat is separated from the vehicle seat by one of a car dealer and end user.

4. The method of claim 1 wherein said vehicle seat is provided with a plurality of floor mats.

5. The method defined in claim 1 further comprising the step of releasably attaching the floor mat to the seat to package the seat and floor mat as a single unit defining the seat assembly.

6. The method defined in claim 5 wherein the floor mat is releasably attached to the seat by a pocket.

7. The method defined in claim 6 wherein the pocket is attached to a cover, the cover having a seat back portion and a seat bottom portion, the cover being adapted to temporarily protect the seat.

8. The method defined in claim 6 wherein the pocket is adjacent a rear portion of the cover.

9. The method defined in claim 6 wherein the pocket is adjacent a forward portion of the cover.

10. The method defined in claim 6 wherein the pocket is positioned on an inner surface of the cover.

11. The method defined in claim 6 wherein the pocket is positioned on a side surface of the cover.

12. The method defined in claim 6 wherein the pocket of the cover is adapted to receive a plurality of floor mats.

13. The method defined in claim 6 wherein the pocket further comprises a closure mechanism for sealing the pocket.

14. The method defined in claim 6 wherein the pocket includes a handle that can be positioned about a headrest of the seat for positioning the floor mat and the pocket with the seat.

15. A method for packaging a vehicle seat and a floor mat to be transported to a vehicle assembly plant comprising the steps of:
    a. providing a plurality of vehicle seats separate from and not yet installed in a vehicle;
    b. providing a plurality of complementary floor mats corresponding to the style of the seats;
    c. pairing at least one vehicle seat and at least one floor mat as a matched set defining a seat assembly;

d. transporting the seat assembly to a vehicle assembly plant, wherein the vehicle seat is transported separately from the vehicle in which it is to be installed.

16. The method defined in claim 15 further comprising the step of releasably attaching the floor mat to the seat to package the seat and floor mat as a single unit defining the seat assembly.

17. The method defined in claim 16 wherein the floor mat is releasably attached to the seat by a pocket.

18. The method defined in claim 16 wherein the at least one vehicle seat is packaged with the plurality of floor mats.

19. The method defined in claim 16 wherein each of the plurality of vehicle seats are packaged with each of the plurality of the floor mats.

20. The method defined in claim 16 wherein the pocket includes a handle that can be positioned about a headrest of the seat for positioning the floor mat and the pocket with the seat.

* * * * *